(No Model.) 2 Sheets—Sheet 1.

F. McKINNEY.
HAY PRESS.

No. 382,822. Patented May 15, 1888.

Witnesses,
Geo. H. Strong.
J. H. Strouse.

Inventor,
F. McKinney.
By Dewey & Co.
Atty.

(No Model.) 2 Sheets—Sheet 2.

F. McKINNEY.
HAY PRESS.

No. 382,822. Patented May 15, 1888.

Witnesses,
Geo. H. Strong

Inventor
F. McKinney.
By Dewey & Co.
Atty

UNITED STATES PATENT OFFICE.

FINCH McKINNEY, OF SAN DIEGO, CALIFORNIA.

HAY-PRESS.

SPECIFICATION forming part of Letters Patent No. 382,822, dated May 15, 1888.

Application filed February 16, 1888. Serial No. 264,230. (No model.)

*To all whom it may concern:*

Be it known that I, FINCH MCKINNEY, of San Diego, San Diego county, State of California, have invented an Improvement in Hay-Presses; and I hereby declare the following to be a full, clear, and exact description of the same.

My invention relates to certain improvements in hay-presses of that class known as "perpetual," in which the hay is forced in successive charges into one end of a tube of proper form to shape the bale, the bales being removed from the opposite end as fast as they are completed; and my invention consists in the constructions and combinations of devices, which I shall hereinafter fully describe and claim, reference being had to the accompanying drawings, in which—

Figure 1:
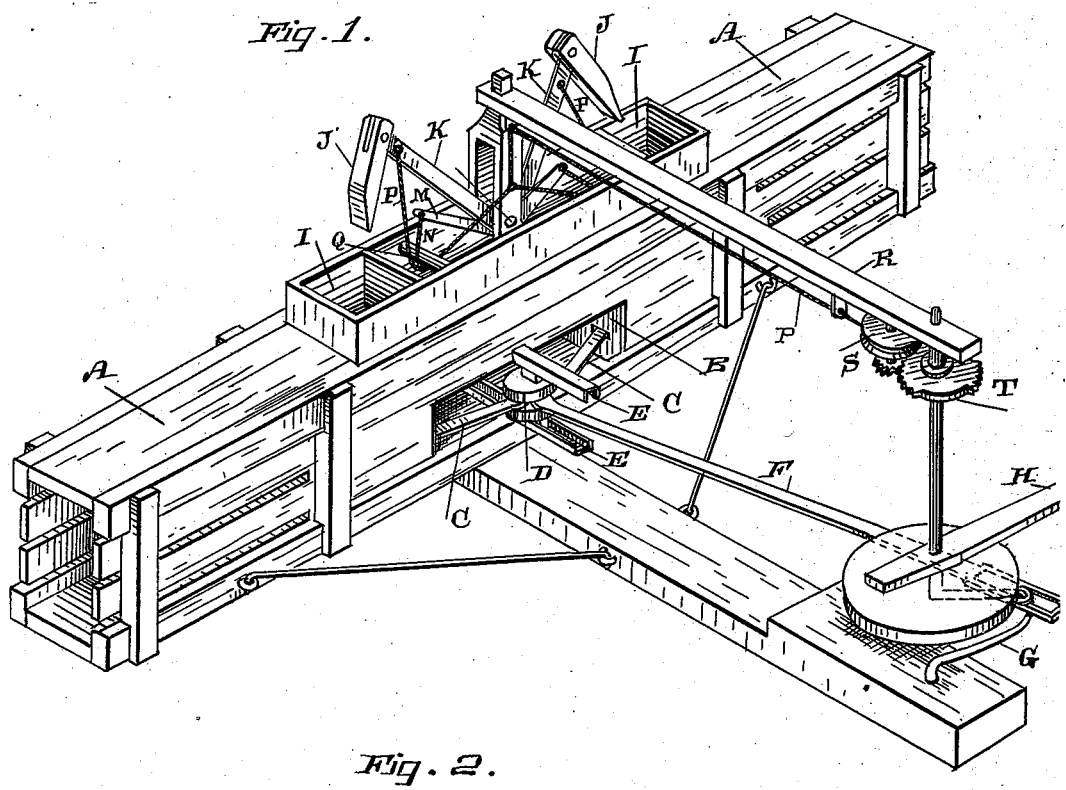
Figure 2:
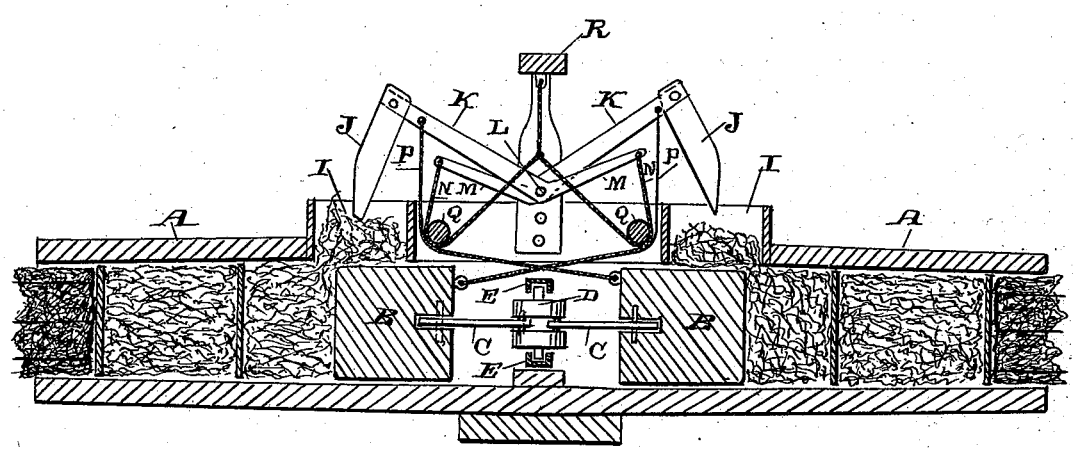
Figure 3:
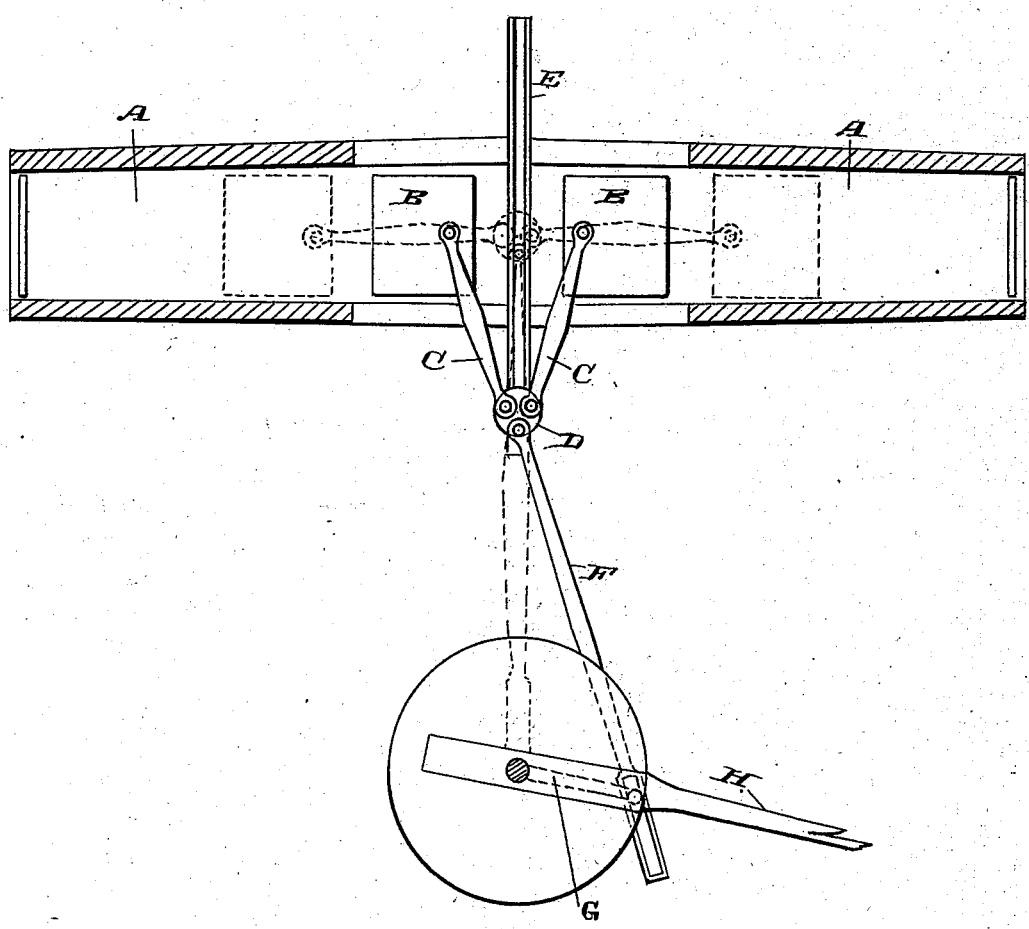

Figure 1 is a perspective view of my press. Fig. 2 is a longitudinal vertical section of the same. Fig. 3 is a horizontal longitudinal section.

A A are two boxes or cases, of a proper shape to form the bales of hay. In the present case they are shown square and slightly contracted from the inner toward the outer ends, so as to produce friction enough to enable the followers B to compress the hay sufficiently to form bales. These followers are in the form of plungers, and are actuated by means of knee-levers C, each of which has one end pivoted to one of the followers, and the other ends of these levers are pivoted to the slide D, which travels in upper and lower parallel guides E at right angles with the position of the press, the press lying horizontally upon the ground or being supported by any suitable or desired supports to hold it steady in place.

The slide D has a pitman, F, connecting it with the crank-arm G of the horse-power, of which H represents the lever to which power is applied. It will be manifest that if desired the lever can be extended upon each side of the center, so that two teams can be attached to it.

The end of the pitman F which connects with the crank G is slotted, so that the crank has a certain amount of play or lost motion through the slot of the pitman at each end of the stroke, thus leaving the plungers or followers stationary for a short time as the crank passes the center at each end of its stroke.

The relative position of the plungers to the slide D and the length of the stroke is such that the plungers are forced into the ends of the presser-chamber while the crank makes one-fourth of a revolution from the center to a point at right angles therewith, thus bringing the slide and the knee-levers in direct line between the followers. The completion of the half-revolution of the crank allows the plungers to be again withdrawn from the press-chambers by the movement of the slide; consequently there will be two forward and back movements to the followers with each complete rotation of the crank. While the plungers are entering the press-chambers and compressing the charge of hay which has been deposited in front of them, hay is pitched into the feed-chambers I by the workmen. These chambers extend upwardly above the inner ends of the press-chambers, and while the plungers are being forced into the chambers they pass beneath these feed-chambers, so that hay which is thrown into the chambers will temporarily lie upon the top of the plungers. As soon as the plungers are withdrawn, the hay falls into the chambers in front of the plungers and is forced farther down by the action of the compressors J. These compressors consist of weights or stampers suspended at the outer ends of the lever-arms K, which are fulcrumed upon a central shaft or pin, L, as shown. These levers have extensions M upon the opposite sides and cords N connected with them passing over guide-rollers or pulleys and connected with the ends of the followers or plungers, so that when the followers are being forced into the press-chambers these extension-levers are drawn down by the action of the cords connecting them with the followers, and the opposite ends, carrying the compressors, are correspondingly raised out of the feed chambers or hoppers, above described, thus allowing a charge of hay to be thrown into each one of the hoppers while the compressors are raised. As soon as the followers are withdrawn from the press-chambers, these compressors fall and force the hay which is in the feed-chambers down in front of the followers, so that at the next advance of the followers this hay will be pressed into the press-chambers. The work thus continues as long as the machine is in operation.

Each of the press-chambers is of sufficient length to contain two bales, and when sufficient hay has been forced into the press-chamber to form one bale an independent follower or board is placed behind this bale, slots or channels being made, through which the binding cords or wires can be passed, so as to tie the bale which is in front before it is forced out of the press, this tying being done while the bale behind is in process of formation. The second bale gradually forces the front one out until it falls out of the press chamber, the independent board or follower falling out with it and being ready to be used again behind the next bale.

In order to insure the compressors forcing the hay down into the press-chamber in front of the follower or plunger, the levers by which they are operated are connected with cords P, which pass around the guide pulleys or rolls Q, thence uniting pass through the guide beneath the horizontal beam R, and to the grooved pulley S, which is journaled near the outer end of this beam, which also serves as a bearing for the upper end of the crank-shaft.

Upon the upper end of the crank-shaft is keyed a mutilated gear-wheel, T, having a few teeth at points opposite to each other, and the flange-pulley around which the cords pass has a pinion secured to its shaft in the same plane with this gear-wheel, so that as the crank-shaft is revolved and it reaches the point where the teeth upon the mutilated wheel engage those upon the pinion of the flanged pulley the latter will be rotated and wind up the cord, thus forcibly drawing the levers which carry the compressors downward and causing them to force the hay into the press-box in front of the plungers or followers. As soon as the toothed portion of the mutilated gear has passed, the pinion upon the pulley-shaft is free to be rotated backward again and the cord unwound, and this is done by the action of the followers moving into the press box and again raising the compressors.

The apparatus is mounted upon wheels, so as to be easily transported from place to place.

Having thus described my invention, what I claim as new, and desire to secure by Letters Patent, is—

1. The press-boxes standing horizontally in line with each other, having their inner ends separated, as shown, in combination with the upper and lower transverse guides standing between the inner ends of the press-boxes, a slide traveling between said guides, a pitman having a slotted head, a crank-shaft connected therewith and to which power is applied and plungers or followers connected with said slide by knee-levers between the slide and plungers, whereby a double reciprocation of the followers takes place with each complete rotation of the driving-crank, substantially as herein described.

2. The combination of the press-boxes, the reciprocating followers, the compressors, and means for operating the compressors and the followers, the flanged pulley and the cords P, by which the compressors are forced downward, a pinion fixed to the pulley on its shaft, and a mutilated gear-wheel fixed to the main crank-shaft and operating to rotate the pulley intermittently, substantially as herein described.

3. The horizontal press boxes with their reciprocating followers, the rising and falling compressors acting in the feed-boxes and having their lever-arms connected with the followers by cords, in combination with the second cords connected with the opposite ends of the lever-arms, the flanged pulley around which the cord passes, and the mutilated gear secured to the crank-shaft and operated thereby, substantially as herein described.

In witness whereof I have hereunto set my hand.

FINCH McKINNEY.

Witnesses:
  A. L. McKinney,
  A. T. Sheldon.